(12) United States Patent
Dhawan et al.

(10) Patent No.: US 8,751,917 B2
(45) Date of Patent: Jun. 10, 2014

(54) SOCIAL CONTEXT FOR A PAGE CONTAINING CONTENT FROM A GLOBAL COMMUNITY

(75) Inventors: Rohit Dhawan, San Francisco, CA (US); Yuankai Ge, Palo Alto, CA (US); Jeffrey Andrew Kanter, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 87 days.

(21) Appl. No.: 13/308,215

(22) Filed: Nov. 30, 2011

(65) Prior Publication Data

US 2013/0139048 A1    May 30, 2013

(51) Int. Cl.
*G06F 17/00* (2006.01)

(52) U.S. Cl.
USPC ........... 715/204; 715/233; 715/255; 707/732; 707/748; 707/754

(58) Field of Classification Search
USPC .......... 715/201, 204, 233, 255; 705/319, 329; 707/732, 748, 754
See application file for complete search history.

(56) References Cited

U.S. PATENT DOCUMENTS

| | | | |
|---|---|---|---|
| 7,853,881 B1 | 12/2010 | Aly Assal et al. | |
| 8,326,770 B1 | 12/2012 | Weisman | |
| 8,417,713 B1 * | 4/2013 | Blair-Goldensohn et al. | 707/751 |
| 8,499,247 B2 * | 7/2013 | Niyogi et al. | 715/753 |
| 8,606,792 B1 * | 12/2013 | Jackson et al. | 707/748 |
| 2006/0161564 A1 | 7/2006 | Pierre et al. | |
| 2008/0102856 A1 | 5/2008 | Fortescue et al. | |
| 2008/0294663 A1 * | 11/2008 | Heinley et al. | 707/100 |
| 2009/0217178 A1 * | 8/2009 | Niyogi et al. | 715/753 |
| 2009/0327338 A1 | 12/2009 | Zhao et al. | |
| 2010/0042511 A1 | 2/2010 | Sundaresan et al. | |
| 2010/0121790 A1 | 5/2010 | Klinkott | |
| 2010/0174709 A1 | 7/2010 | Hansen et al. | |
| 2011/0113349 A1 | 5/2011 | Kiciman et al. | |
| 2011/0145064 A1 | 6/2011 | Anderson et al. | |
| 2011/0153666 A1 | 6/2011 | Flynn et al. | |
| 2011/0264532 A1 | 10/2011 | Chan et al. | |
| 2011/0270850 A1 * | 11/2011 | Wana et al. | 707/749 |
| 2011/0270922 A1 | 11/2011 | Jones et al. | |
| 2012/0084133 A1 | 4/2012 | Ross et al. | |
| 2012/0290446 A1 * | 11/2012 | England et al. | 705/27.1 |
| 2013/0117284 A1 * | 5/2013 | Roozen et al. | 707/748 |
| 2013/0138644 A1 * | 5/2013 | Yahia et al. | 707/733 |
| 2013/0297623 A1 * | 11/2013 | Niyogi et al. | 707/751 |

* cited by examiner

*Primary Examiner* — Stephen Hong
*Assistant Examiner* — Matthew Ludwig
(74) *Attorney, Agent, or Firm* — Fenwick & West LLP

(57) ABSTRACT

Posts are ranked for display on a page in a social network environment based on interaction and user score signals associated with the post and a viewing user. The signals for each of the posts are scored, and a ranking score for each post is determined. The posts are ranked in an order for display based on the ranking score and displayed for the viewing user on the page. Posts submitted by other users who have established connections with the viewing user are also filtered for display in a social box on the page.

27 Claims, 9 Drawing Sheets

SOCIAL CONTEXT FOR A PAGE CONTAINING CONTENT FROM A GLOBAL COMMUNITY

BACKGROUND

1. Field

This disclosure relates generally to filtering and ranking posts on a page dedicated to a topic of interest in a social network.

2. Description of the Related Art

Pages in a social network can be dedicated to a topic of interest, such as a brand or product, a public figure, a business, or a location. Users of a social network can visit the page and post text, comments, photos, links, or other content to the page. Users can also view posts that have been submitted by other users of the social network, regardless of any relationship between the viewer and the poster. Accordingly, pages can display a collection of posts from users who are not connected to each other in the social network.

Typically, the posts are displayed in chronological or reverse-chronological order, without regard to other considerations such as the content of the posts or the users' interactions with the posts. Certain posts may contain spam or uninteresting information from the viewpoint of an administrator of the page or other viewing users. If a page contains low quality content, negative content, or irrelevant material, a viewing user can be deterred from reading the remaining posts or from returning to the page in the future.

SUMMARY

Methods and systems are provided for ranking posts for display to a viewing user on a social network page using data associated with the post and information about the viewing user. Pages are populated with posts by users who have an established connection with a page. Users can establish a connection with the page by joining the page or "liking" the page. Posts are ranked in an order for display on the page to a viewing user based on an analysis of various signals associated with the post. Signals can include interaction signals and user score signals. Interaction signals include data intrinsic to the post itself, such as the time at which the post was submitted, the number of likes or comments associated with the post, the content of the post, and data about the user who submitted the post, such as the frequency of visits by the user to the page, the number of previous posts by the user on the page, etc. An interaction score is determined based on the interaction signals that are intrinsic to the post.

In addition, an overall user score is determined based on an analysis of the user signals associated with a viewing user. User score signals are signals that are associated with the viewing user, such as the viewing user's history of actions associated with the page, the preferred language of the viewing user, and similar likes shared between a viewing user and the posting user. An overall ranking score is calculated for each post using the overall interaction score and the overall user score. The ranked posts are then transmitted for display to the viewing user.

The posts associated with a page can also be filtered to display posts submitted by users who have an established connection ("friends") with the viewing user. The filtered posts are displayed separately in a social box on the page.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the present invention provide systems, methods, and computer readable storage media for ranking posts on a page dedicated to a topic of interest in an online social network.

An online social network provides users a way to connect and communicate with other users. Social networks allow users to establish relationships or connections with others and share information in a variety of useful ways. A user is a person who has an account in the social network and establishes connections with other users, groups, or organizations via the social network. Some users are directly connected to each other, e.g., by having added each other as "friends" in the network. Many of the users are not directly connected to each other, but may have similar interests or "likes."

Pages in an online social network are dedicated to a topic of interest. A topic of interest can include, for example, a business or company, a place of interest or a geographic location, a brand or a product, a private or public figure, a form of entertainment (e.g., music, sports, activities, movies, etc.), a cause or a community, or any other category. The page provides a forum for users who have a collective interest in the topic. An administrator ("admin") is a type of user who can create and/or manage the page. One or more admins can control the content and look of the page.

On a given page, users can post comments, pictures, links, videos, media, or other content. Users can also add comments to or express an interest in ("like") other posts on the page. The users' comments, posts, etc. are displayed on a section of the page called the wall. A user can like another user's comment or comment on another user's picture (e.g., Dan can like Bob's comment about his favorite type of coffee on a page dedicated to Starbucks). A user can also like a page. When a user likes a page, he or she joins a community of other users who have expressed an interest in the topic and are connected to the page. Interactions within the social network (e.g., interactions among users, interactions between a user and a page, or interactions between a user and a post on a page) are collectively referred to as "actions" in the social network. A connection between a user and a page (or a connection between two users) is called an "edge."

Figure 1:
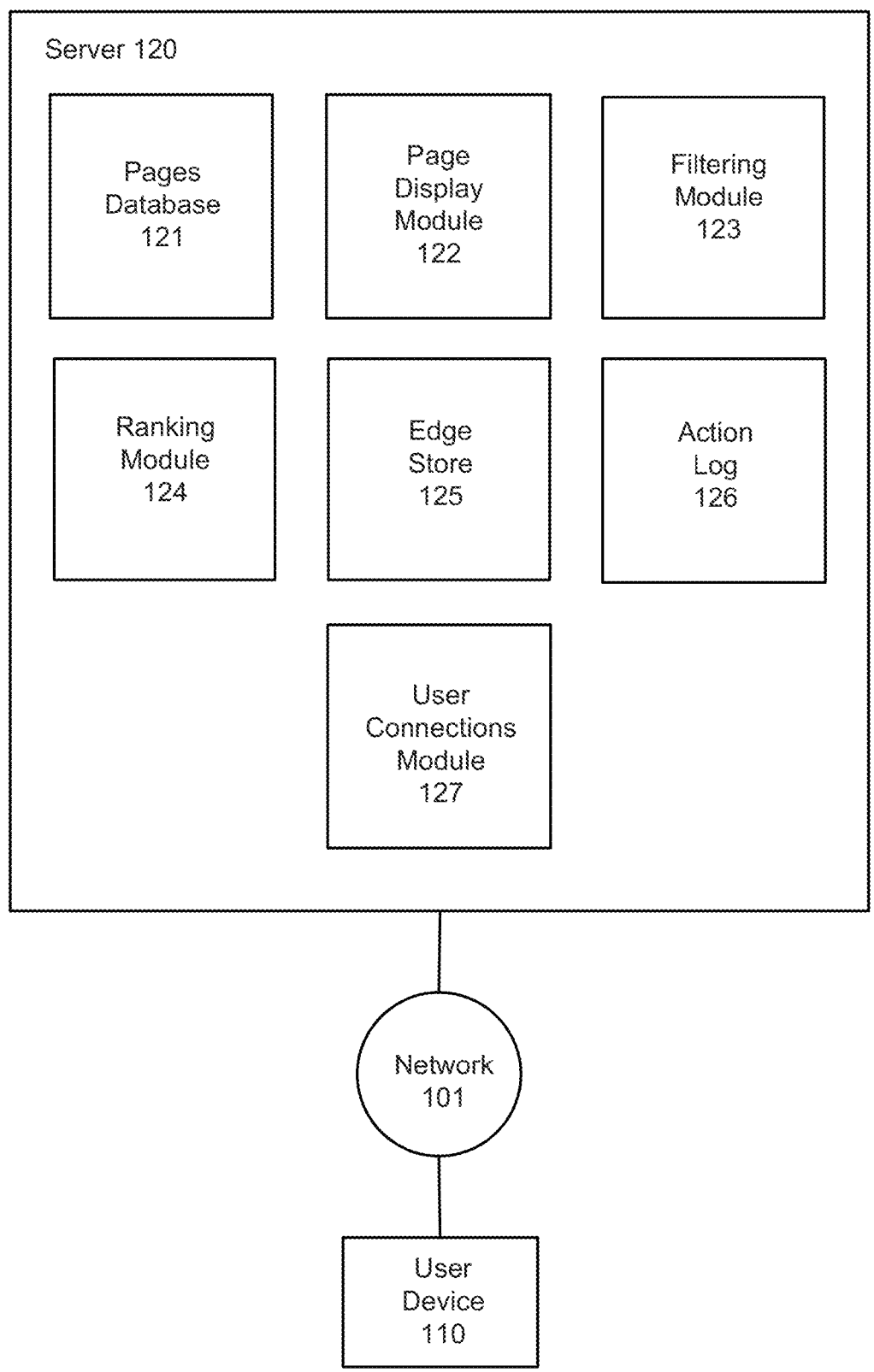
FIG. 1 is a high-level block diagram of a system environment, in accordance with an embodiment of the invention.

FIG. 1 is an illustration of a system environment 100 in accordance with one embodiment of the invention. The system environment 100 includes a network 101, one or more user devices 110, and a server 120.

The network 101 represents a communication pathway between the server 120 and the user device 110. In one embodiment, the network 101 is the Internet and uses standard communications technologies and/or protocols. The network 101 can also utilize dedicated, custom, or private communications links that are not necessarily part of the Internet. The network 101 may comprise any combination of local area and/or wide area networks, using both wired and wireless communication systems.

The user device 110 can be a desktop computer, laptop computer, portable computer, personal digital assistant (PDA), smart phone, or any other device including computing functionality and data communication capabilities. A plurality of user devices 110 can be configured to communicate via the network 101.

The server 120 includes a pages database 121, a page display module 122, a filtering module 123, a ranking module 124, an edge store 125, an action log 126, and a user connections module 127.

The pages database 121 stores data about the content and layout of a page, including the posts that are associated with the page. The pages database 121 can also store filtering and rankings of posts for display on the page.

The page display module 122 receives requests for a page from one or more viewing users. The page display module 122 retrieves data associated with the requested page from the pages database 121 and displays the content of the page to one or more viewing users. In some embodiments, the page display module 122 retrieves data associated with the requested page from the pages database 121 and sends the data for processing to the filtering module 123.

The filtering module 123 receives the posts associated with the page from the page display module 122 and filters the posts for display on the page. In one embodiment, an admin can establish rules for filtering the types of posts that are displayed on the page. For example, rules can be created that filter out posts that contain profanity, posts submitted by underage users, or posts submitted by a blocked user or a user who has previously posted negative or irrelevant content in the past. In some embodiments, filters can be used to remove posts containing negative content or certain key words. In other embodiments, multiple filters are used by the filtering module 123 to filter out posts associated with the page. In another embodiment, filters are not applied to a page. In yet another embodiment, posts that have been filtered (removed from display) are still shown to the user who posted the filtered post, but not shown to other viewing users.

Once the posts associated with a page have been filtered, the ranking module 124 ranks the remaining posts according to a ranking score that is calculated by analyzing various signals associated with each post. A signal can be categorized as an interaction signal or a user score signal. An interaction signal is a signal that is intrinsic to the post or associated with the post, such as the time of the post, the number of users who like the post, the number of comments associated with the post, or data about the user who submitted the post (e.g., the number of visits by the posting user to the page, the number of posts previously submitted by the posting user, the number of likes or comments on the page generated by the posting user's post). Other types of interaction signals include data about flags from other users (called a "downvote") and data about whether the admin likes the post (called an "upvote"). In addition, user score signals are signals that are associated with a viewing user. Examples of user score signals include the number of visits to the page by the viewing user, the number of actions by the viewing user associated with the page, similar likes or interests shared by the viewing user and the posting user, or the preferred language of the viewing user.

Figure 2:
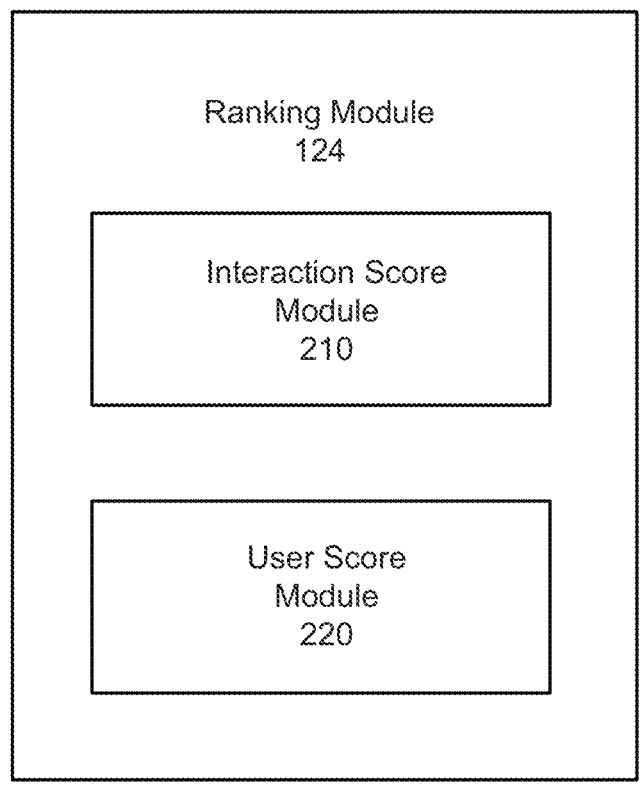
FIG. 2 is a high-level block diagram of a ranking module, in accordance with an embodiment of the invention.

As shown in FIG. 2, the ranking module 124 includes an interaction score module 210 and a user score module 220. The interaction score module 210 identifies and analyzes interaction signals associated with each post. The interaction score module 210 determines a sub-score for each of the interaction signals associated with a post and calculates an overall interaction score for the post using the sub-scores. An overall interaction score is associated with the post and can be calculated for each post on the page.

For each interaction signal, the interaction score module 210 can use a pre-determined value or a calculated value for the interaction signal. For instance, a certain number of likes associated with a post can be designated a pre-determined sub-score (e.g., a sub-score of 5.0 for 5 likes associated with the post). In another example, a recently posted post can be assigned a higher sub-score than an earlier-posted post on the page.

In some embodiments, the sub-scores for the interaction signals can be weighted to determine the overall interaction score. In some embodiments, certain interaction score signals are given more weight than other interaction score signals. A calculated or raw score for a signal is modified by different multipliers to reflect their relative importance. The multipliers can be designated by an admin of the page or automatically set by the social network system. For example, the number of comments or likes associated with a post (e.g., 10 likes) can be given greater weight than the timing of the post (e.g., 3 days ago). In one embodiment, the multipliers for the interaction score signals can increase the overall interaction score of the post. The weighted values can be combined to form an overall interaction score.

In one example, the interaction score module 210 determines that a post is associated with the following interaction signals: a time of the post (Tuesday, October 10, at 10:00 AM), number of likes ("liked" by ten other users), and number of comments (the post received three comments). The interaction score module 210 determines (i) a sub-score for the time that the post was posted (e.g., earlier posts can be given a higher sub-score), (ii) a sub-score for the number of users that liked the post, and (iii) a sub-score for the number of comments posted by other users. Each of the interaction signals are calculated into a sub-score or designated a sub-score by the interaction score module 210.

In some embodiments, the interaction score module 210 can analyze the number of posts or actions taken by a posting user on the page and then determine a sub-score for the post based on the posting user's activities. For instance, if a posting user has added numerous posts to a Starbucks page over a period of time, or submitted several comments or likes on the page in the past, the interaction score module 210 can determine a sub-score for the post based on the posting user's past actions associated with the page (e.g., a high frequency of activity by the posting user can be associated with a greater sub-score for the post).

In another embodiment, the interaction score module 210 can also analyze the content of the post and determine a sub-score based on the content. For example, key words or phrases, emoticons, punctuation, or other indicators of positive or favorable content can be used to determine the nature of the post. In other embodiments, an admin can assess the content of the post and determine a sub-score for the post.

Accordingly, these interaction sub-scores (and numerous other signals that are intrinsic to the post) are used to determine an overall interaction score for the post. The interaction sub-scores can be combined or translated into an overall interaction score.

In addition, the user score module 220 analyzes each of the user score signals associated with a post and determines sub-scores for each of the user score signals. The sub-scores are used to calculate an overall user score for the post. The user score module 220 analyzes the user score signals and determines an overall user score by combining the sub-scores for each of the signals associated with the viewing user. In one embodiment, the sub-scores for the user score signals can be weighted to determine the user score. In some embodiments, certain signals are given more weight than other signals.

In another embodiment, weights are decided by heuristics and analyzed using data pulled from various pages. Interaction and user scores are weighted and summed, and then multiplied by a time decaying factor. In one embodiment, a modifier to the score is added based on the following rules: (1) If there are several posts by an admin on the page, the admin's posts are ranked such that that they appear in reverse chronological order, but the users' posts are ranked using the methods described herein (e.g., user signals and interaction signals); (2) If there are multiple posts by the same author, the score is multiplied by 1/N to the N-th post to ensure that no one user can dominate the wall. For example, a user may submit five posts out of the first 30 posts on a page. The score of the user's second post is multiplied by ½, the user's third post is multiplied by ⅓, and so forth. This ensures that the top posts displayed on a page are not all from the same author.

In other embodiments, a machine learning algorithm is used to decide the best weight for each score, based on an analysis of previously ranked posts. Various data from previously ranked posts on pages are input as signals and analyzed by the machine learning algorithm. The machine learning algorithm is then trained on a set of signals from a page that has previously ranked posts. Once the machine learning algorithm has been trained on a known data set, the algorithm can be used for determining best weights for various scores.

An example of a user score signal is the preferred language of the viewing user. Posts that include the same language as the preferred language used by the viewing user are given sub-scores that indicate the similarity in language. In one example, if the viewing user uses Spanish as his preferred language in the social network, a post that has Spanish content is given a higher sub-score than posts that include different languages.

In some embodiments, the user score module 220 also determines a sub-score that assesses similar or common interests (likes) shared by the viewing user and a posting user. The user score module 220 can analyze the types of interests of the viewing user and compares those interests with other posting users on the page. For example, a viewing user may like the following pages: a Starbucks page, a Britney Spears page, a San Francisco Giants page, and a skiing page. The user score module 220 can determine other users who also like the same pages. The user score module 220 can determine a similarity sub-score for the viewing user and those posting users with common likes or actions. The user score module 220 can also analyze the connections and/or actions between a viewing user and a posting user who do not have an established relationship in the social network. If a viewing user has previously commented or liked a post by a posting user, the user score module 220 can determine a sub-score for the post based on those previous interactions.

Accordingly, these user sub-scores (and numerous other signals that are associated with the viewing user) are used to determine an overall user score for the post. The user sub-scores can be combined or translated into an overall user score.

The ranking module 124 receives the overall interaction score from the interaction score module 210 and the overall user score from the user score module 220. The ranking module 124 determines an overall ranking score for each of the posts based on the overall interaction score and the overall user score. In some embodiments, the overall interaction score and the overall user score are combined to determine a ranking score. The ranking module 124 determines the rank of the posts for display on the page based on the ranking score of each post.

The ranking module 124 sends the ranked posts in the order of the ranking scores to the page display module 122 for display on the page to the viewing user. In some embodiments, posts with high ranking scores are displayed in the order of their respective ranking scores at the top of the page (called "top posts"), and posts with lower ranking scores are displayed at the bottom of the page ("bottom posts").

Figure 3:
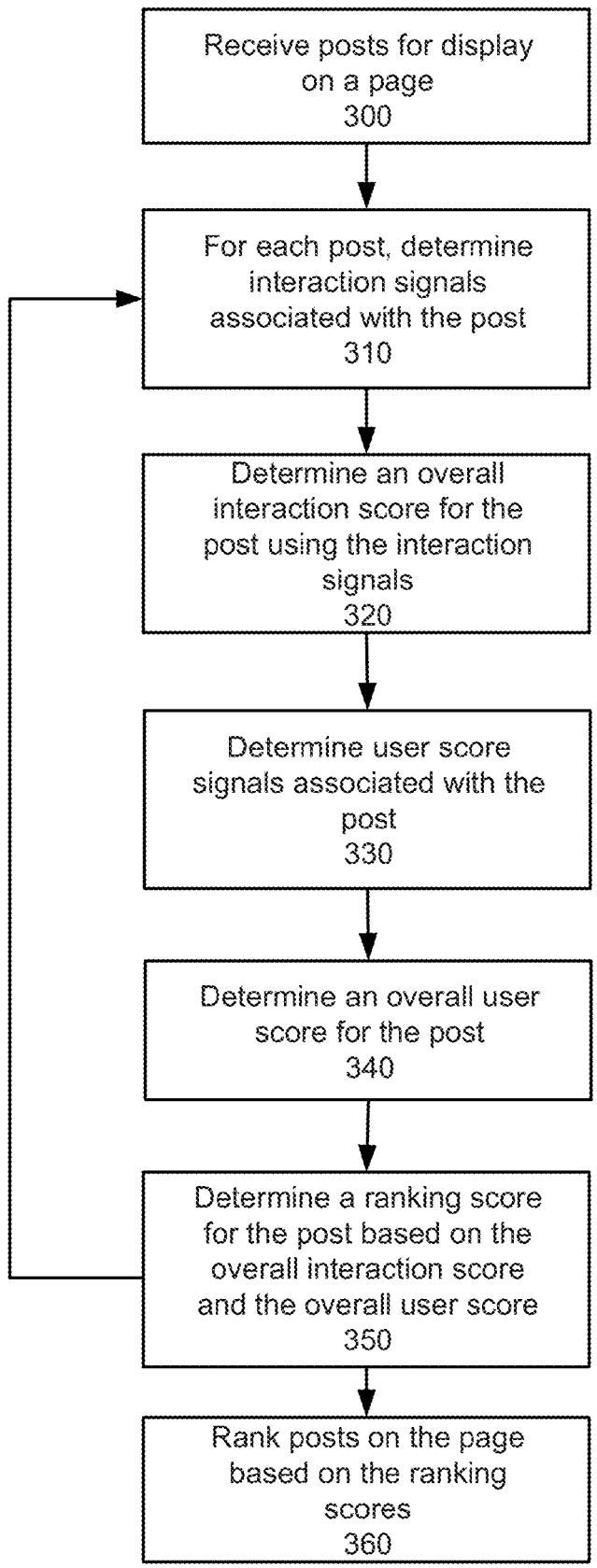
FIG. 3 is a flow chart illustrating a method of ranking posts for display on a page, in accordance with an embodiment of the invention.

FIG. 3 is a flow chart that illustrates the ranking method, in accordance with one embodiment of the invention. Posts that are associated with a page are received 300 for display on the page. For each post, interaction signals that are associated with the post are analyzed 310. An overall interaction score is determined 320 based on the interaction signals. Next, user score signals are analyzed 330 for the post. An overall user score is determined 340 for the post based on the user signals. A ranking score is then determined 350 based on the overall user score and the overall interaction score. These steps 310-350 are repeated for each post associated with the page. Posts are ranked 460 for display on the page based on the ranking score of each post.

Referring again to FIG. 1, the edge store 125 stores the established connections among users and pages of the social network. When a user likes a page, the edge store 125 creates an edge between the user and the page, and stores the edge in a database. The edge store 125 also stores edges between users (e.g., when user A friends user B")). In some embodiments, the user score module 220 accesses data from the edge store 125 to determine which users are connected to the page and/or connected to each other, when assessing similar or common characteristics or interests shared among users associated with a page.

The action log 126 stores the actions among users of a page or within the social network. For instance, if a user comments on a post, the action log 126 stores the action between the user and the page. The action log 126 can also store the action between a viewing user and a posting user. The interaction score module 210 and the user score module 220 can access data from the action log 126 to determine actions taken by users who are connected to a page, the history of comments, posts or likes by a user on a page, etc.

The user connections module 127 performs a separate filtering of the posts associated with a page. The user connections module 127 selects posts that are submitted by the viewing users' friends, and these posts are displayed in a separate section of the page, called a social box. The user connections module 127 accesses data from the edge store 125 about established connections between the viewing user and other users who like the page and have posted on the page (e.g., friends of the viewing user). The user connections module 127 then selects the posts that have been submitted by other users who have established connections with the viewing user. In some embodiments, the user connections module 127 can send the viewing user's friends' posts to the ranking module 124 for an additional ranking of the filtered posts based on the various interaction or user score signals, as described above (such as the number of likes or comments associated with the post). In other embodiments, the selected posts from a viewing user's friends are not filtered (removed) before displaying in the social box, even though they have been filtered by the filtering module 123 for display on the main wall of the page. The friends' posts are sent to the page display module 122 for display in a social box on the page.

Figure 4:
FIG. 4 is an example of a page in an online social network, in accordance with an embodiment of the invention.

FIG. 4 illustrates an exemplary page 400 in the social network, according to one embodiment of the invention. The page 400 is dedicated to Starbucks, a coffee company, and the page includes posts by various users who like Starbucks. In one example, the ranking module 124 ranks the posts for display on the main wall 420 of the page 400 based on the overall ranking score of each post, which have been analyzed for various user score signals and interaction signals. As shown in FIG. 4, the top posts on the wall 420 of the page are ranked higher based in part on the number of likes 430 and positive comments 440 associated with the post.

FIG. 4 also illustrates the social box 410 for displaying posts by friends of the viewing user. The social box 410 includes the names, pictures, and posts of the friends of the viewing user who also like the Starbucks page 400. In some embodiments, the posts in the social box 410 are not filtered by the filtering module 123, even if the posts for display on the main wall of the page 400 have been filtered. In addition, if a post by a viewing user's friend is filtered (removed) from display on the main wall 420, other users will not see the post on the main wall 420, but the viewing user will still see the post displayed in the social box 410.

Figure 5:
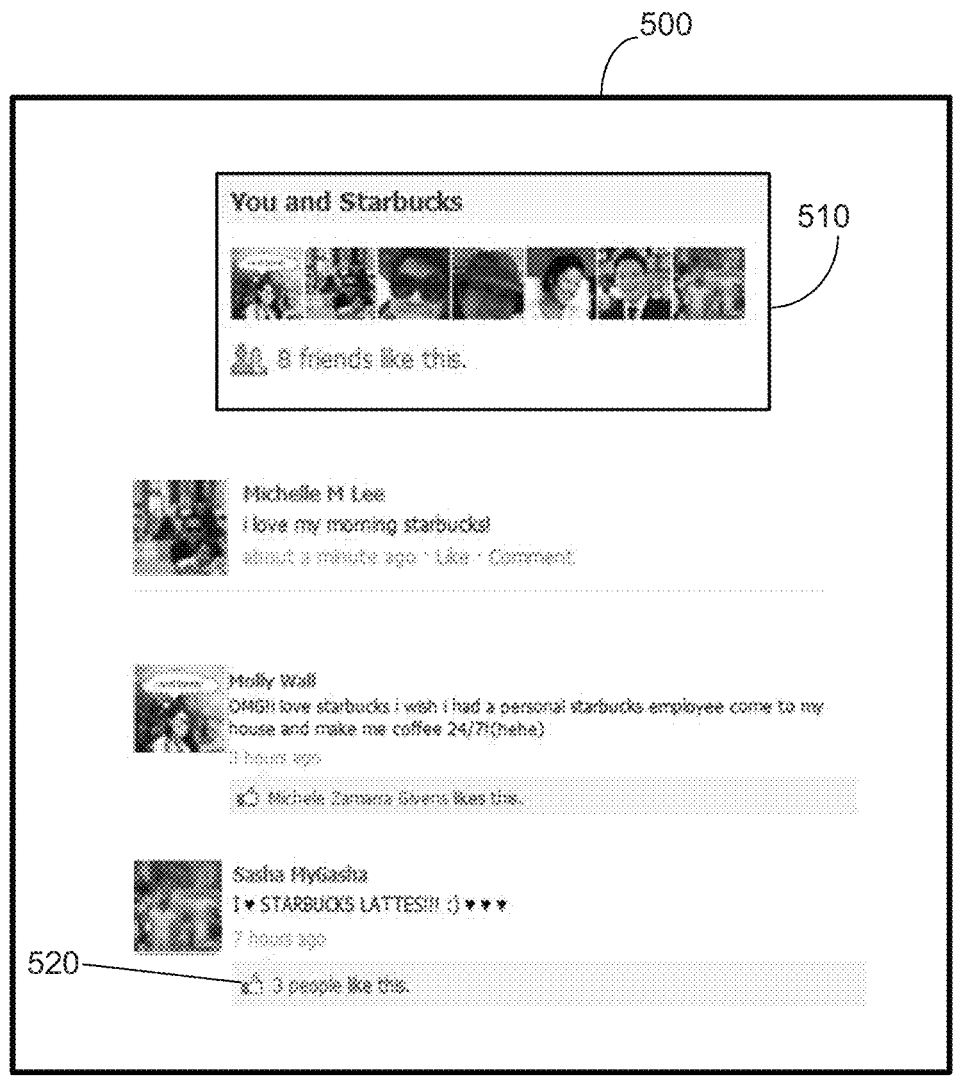
FIG. 5 is an example of a social box on a page, in accordance with an embodiment of the invention.

FIG. 5 shows an expanded view of the social box 500 that includes the viewing users' friends' posts. In this example, the user connections module 127 determines that 8 friends 510 of the viewing user like the Starbucks page, and 3 of the 8 friends have posted on the page. The page display module 122 can display the connections in the social box under the title "You and Starbucks." The posts can also be displayed based on the timing of the posts, as shown in the social box 500. In certain embodiments, the posts by the viewing user's friends can be ranked by the ranking module 124 based on various signals, such as the number of likes 520 associated with the post.

Figure 6:
FIG. 6 is an example of a ranking of top posts on a page, in accordance with an embodiment of the invention.

FIG. 6 illustrates an exemplary ranking of top posts on a page 600. Using the methods described above, the ranking module 124 ranks the "top posts" with the highest-ranking scores at the top of the page. For instance, the top posts displayed in FIG. 6 have a higher number of likes, number of comments, or positive content than other posts on the page and have been ranked for display based on the ranking score of the post. In this example, the top posts on the Starbucks page 600 have been ranked according to various signals, such as the number of comments 610, number of likes 620, positive content, and language of the viewing user (English).

Figure 7:
FIG. 7 is an example of a ranking of bottom posts on a page, in accordance with an embodiment of the invention.

FIG. 7 illustrates an exemplary ranking of bottom posts for display on a page 700. Bottom posts are posts that have lower ranking scores based on analysis of the interaction signals and user score signals associated with the post. In one example, where the language of the post 710 is different than that of the viewing user, the post is ranked lower than the posts that are written in the language of the viewing user. Certain posts may be ranked lower on the page based on various other signals, such as the lack of substantive content in the post 720, spelling errors 730, or likes or comments by other users 740 who have previously posted negative or undesirable content.

Figure 8:
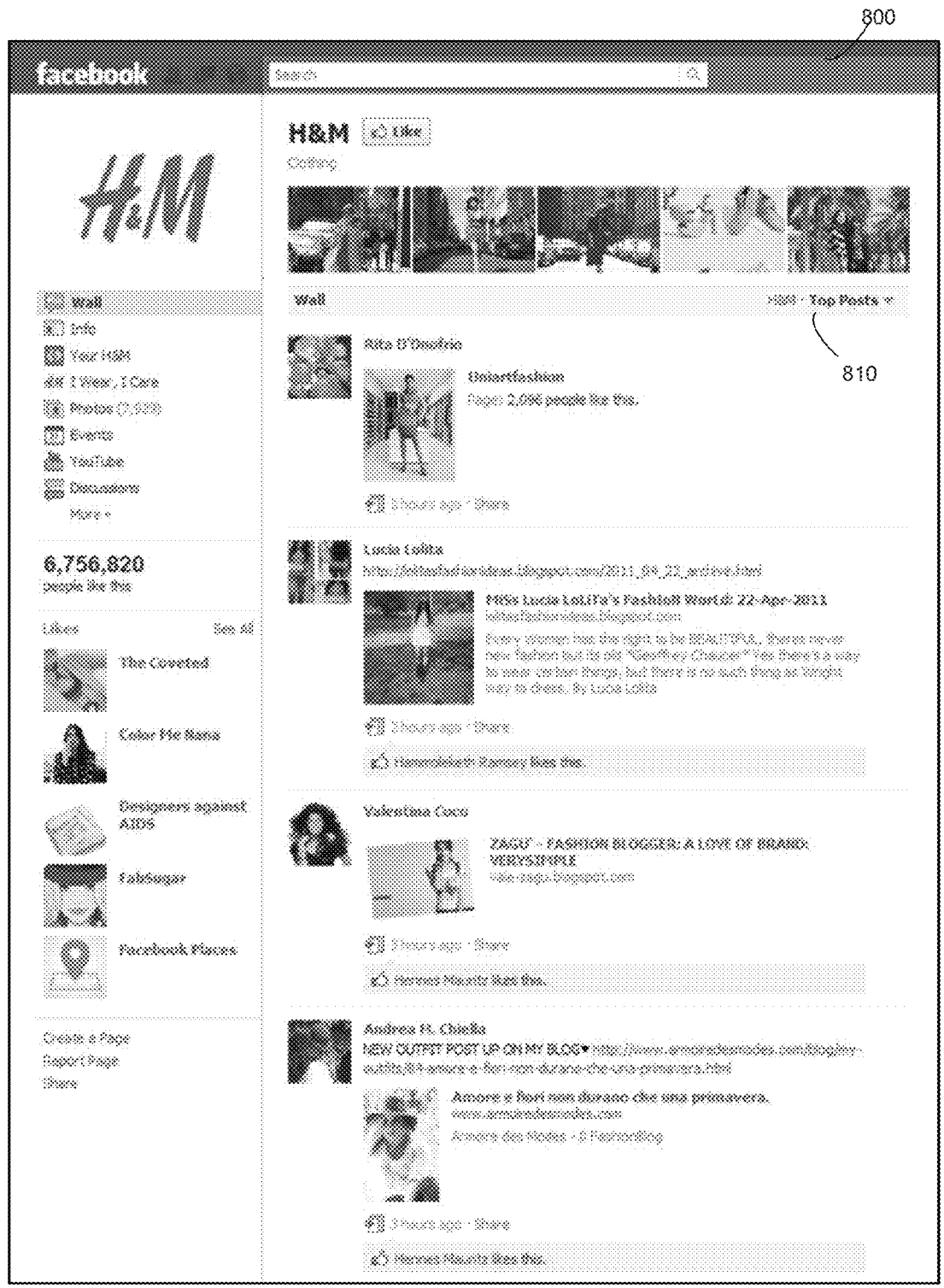
FIG. 8 is an example of a page displaying ranked top posts on a page, in accordance with an embodiment of the invention.
Figure 9:
FIG. 9 is another example of a page displaying ranked top posts on a page, in accordance with an embodiment of the invention.

Posts that are filtered and ranked by the methods described above can be selected for display. FIG. 8 is an example of a page 800 showing the "top posts" for display using the methods described above. In some embodiments, the wall can be filtered to only show posts submitted by the owner or the admin of the page (H&M). In another embodiment, the wall can be filtered to show top posts that have been filtered by the methods described above. FIG. 9 is another example of a page 900 where the top posts 910 have been selected for display. The top posts can include posts submitted by the admin or owner of the page (e.g., Toyota USA), as well as posts by other users.

In one embodiment, a user device 110 requests a page for display from a website server, which may be outside of and separate from the social network. The server sends to the user device 110 a markup language document that includes an instruction for a browser application running on the user device 110 to incorporate within the web page information obtained from the social networking system and also capture within the web page structured actions on specified objects, such as clicking on links and buttons that are tagged in the markup language document. In one embodiment, the instruction creates a frame within the web page that contains content pulled directly from the social network (e.g., an iframe). The content of the frame, provided by the social network, includes information queried from a page of interest. Such information includes the ranked posts on the page and information about the topic of interest. The frame may also contain social information that is relevant to the user, such as posts by the user's friends in a social box. User-specified queries and template queries may be used to populate the content of the frame, in one embodiment.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request to display a page to a first user of a plurality of users of the social networking system;
   determining an interaction score for each of a plurality of posts associated with the page, the interaction score for a post based on one or more interactions with the post by a plurality of users that includes one or more other users of the social networking system who are not connected to the first user in the social networking system;
   determining a user score for each of the plurality of posts with respect to the first user, wherein the user score is determined based on at least one of: the first user's history of actions associated with the page, and one or more similarities between the first user and a posting user;
   ranking each of the plurality of posts based on the interaction score and the user score; and
   sending the page including a subset of the plurality of posts selected according to the ranking for display to the first user.

2. The method of claim 1, wherein the interaction score is determined based on a number of comments contributed by the plurality of users and associated with each of the plurality of posts.

3. The method of claim 1, wherein the interaction score is determined based on a number of likes associated with each of the plurality of posts.

4. The method of claim 1, wherein the interaction score is determined based on a timing of each of the plurality of posts.

5. The method of claim 1, wherein the interaction score is determined based on a frequency of visits to the page by a posting user.

6. The method of claim 1, wherein the interaction score is determined based on a number of actions by the posting user on the page.

7. The method of claim 1, wherein the user score is determined based on a preferred language of the first user.

8. The method of claim 1, wherein the user score is determined based on a number of visits by the first user to the page.

9. The method of claim 1, wherein the user score is determined based on common likes shared between the first user and a posting user.

10. The method of claim 1, further comprising determining a subset of the plurality of posts submitted by one or more users who have an established connection with the first user.

11. The method of claim 10, further comprising displaying the subset of the plurality of posts on a separate wall on the page.

12. The method of claim 10, wherein the one or more users have an established connection with the page.

13. The method of claim 12, further comprising displaying a name and a picture for each of the one or more users who have an established connection with the first user and the page.

14. A computer comprising a non-transitory computer-readable storage medium containing computer program code for:
   receiving a request to display a page to a first user of a plurality of users of the social networking system;
   determining an interaction score for each of a plurality of posts associated with the page, the interaction score for a post based on one or more interactions with the post by a plurality of users that includes one or more other users of the social networking system who are not connected to the first user in the social networking system;
   determining a user score for each of the plurality of posts with respect to the first user, wherein the user score is determined based on at least one of: the first user's history of actions associated with the page, and one or more similarities between the first user and a posting user;
   ranking each of the plurality of posts based on the interaction score and the user score; and
   sending the page including a subset of the plurality of posts selected according to the ranking for display to the first user.

15. The computer program product of claim 14, wherein the interaction score is determined based on a number of comments contributed by the plurality of users and associated with each of the plurality of posts.

16. The computer program product of claim 14, wherein the interaction score is determined based on a number of likes associated with each of the plurality of posts.

17. The computer program product of claim 14, wherein the interaction score is determined based on a timing of each of the plurality of posts.

18. The computer program product of claim 14, wherein the interaction score is determined based on a frequency of visits to the page by a posting user.

19. The computer program product of claim 14, wherein the interaction score is determined based on a number of actions by the posting user on the page.

20. The computer program product of claim 14, wherein the user score is determined based on a preferred language of the first user.

21. The computer program product of claim 14, wherein the user score is determined based on a number of visits by the first user to the page.

22. The computer program product of claim 14, further comprising determining a subset of the plurality of posts submitted by one or more users who have an established connection with the first user.

23. The computer program product of claim 14, further comprising displaying the subset of the plurality of posts on a separate wall on the page.

24. The computer program product of claim 14, wherein the one or more users have an established connection with the page.

25. The computer program product of claim 14, further comprising displaying a name and a picture for each of the one or more users who have an established connection with the first user and the page.

26. A method comprising:
   receiving a request to display a page to a first user of a plurality of users of the social networking system;
   receiving a first plurality of posts for display on the page;
   determining an interaction score for each of a plurality of posts associated with the page, the interaction score for a post based on one or more interactions with the post by a plurality of users that includes one or more other users of the social networking system who are not connected to the first user in the social networking system;
   determining a user score for each of the plurality of posts with respect to the first user, wherein the user score is determined based on at least one of: the first user's history of actions associated with the page, and one or more similarities between the first user and a posting user;
   ranking each of the plurality of posts based on the interaction score and the user score;
   determining a second set of posts comprising posts associated with the page and submitted by other users who have an established connection with the first user;
   sending the page including a subset of the plurality of posts selected according to the ranking and the second set of posts for display to the first user.

27. The method of claim 26, wherein the second set of posts is displayed in a social box separately from the first plurality of posts on the page.

\* \* \* \* \*